(12) United States Patent
Lambrick (10) Patent No.: US 9,782,832 B1
(45) Date of Patent: Oct. 10, 2017

(54) BORING TOOL

(71) Applicant: DCT/Precision, L.L.C., Decatur, IL (US)

(72) Inventor: John D. Lambrick, Decatur, IL (US)

(73) Assignee: DCT/Precision, L.L.C., Decatur, IL (US)

( * ) Notice: Subject to any disclaimer, the term of this patent is extended or adjusted under 35 U.S.C. 154(b) by 15 days.

(21) Appl. No.: 14/669,220

(22) Filed: Mar. 26, 2015

Related U.S. Application Data (60) Provisional application No. 61/967,989, filed on Mar. 31, 2014.

(51) Int. Cl.
 *B23B 29/034* (2006.01)

(52) U.S. Cl.
 CPC .... *B23B 29/0341* (2013.01); *B23B 2260/038* (2013.01); *Y10T 408/85893* (2015.01)

(58) Field of Classification Search
 CPC .......... B23B 29/0341; B23B 29/03407; B23B 2260/038; Y10T 408/85893; Y10T 408/85892; Y10T 408/83; Y10T 408/86
 See application file for complete search history.

(56) References Cited

U.S. PATENT DOCUMENTS

| | | | | |
|---|---|---|---|---|
| 2,374,325 A * | 4/1945 | Borek | ................. | B23B 29/0341 408/116 |
| 2,680,390 A * | 6/1954 | Chapman | ............ | B23B 29/0341 408/168 |
| 2,768,831 A * | 10/1956 | Bellmann | ......... | B23B 29/03407 279/6 |
| 3,102,441 A * | 9/1963 | Milewski | .......... | B23B 29/03403 407/79 |
| 3,195,376 A * | 7/1965 | Bader | ................... | B23C 5/2441 407/49 |
| 3,236,125 A * | 2/1966 | Lundgren | ......... | B23B 29/03417 407/112 |
| 3,327,572 A * | 6/1967 | Lovendahl | .......... | B23B 29/0341 407/104 |
| 4,133,399 A | 1/1979 | Herrmann | | |
| 4,362,445 A * | 12/1982 | Armbrust | ............ | B23B 29/0341 408/182 |
| 5,188,490 A | 2/1993 | Muendlein et al. | | |
| 6,406,225 B1 | 6/2002 | Stojanovski | | |
| 6,957,936 B2 * | 10/2005 | Kress | ...................... | B23B 5/168 408/181 |
| 7,029,210 B2 * | 4/2006 | Schlagenhauf | ......... | B23C 3/055 407/36 |
| 7,753,626 B2 * | 7/2010 | Musil | .................. | B23B 29/0341 407/39 |

(Continued)

FOREIGN PATENT DOCUMENTS

| | | |
|---|---|---|
| CN | 102335759 | 2/2012 |
| CN | 203076611 | 7/2013 |
| JP | 2006150535 | 6/2006 |

*Primary Examiner* — Eric A Gates
*Assistant Examiner* — Donte Brown
(74) *Attorney, Agent, or Firm* — Philip L. Bateman (57) ABSTRACT

A boring tool has one or more cutters whose radial and axial positions are both easily adjusted. The radial positions are adjusted by the axial movement of wedges that press against cartridges holding the cutters. The axial positions are adjusted by the axial movement of screws that support the cartridges holding the cutters.

15 Claims, 6 Drawing Sheets

(56) References Cited

U.S. PATENT DOCUMENTS

| | | | |
|---|---|---|---|
| 8,985,916 B2 * | 3/2015 | Kocherovsky | B23B 29/0341 407/39 |
| 2010/0196110 A1 * | 8/2010 | Kress | B23B 29/03407 408/147 |
| 2010/0303569 A1 * | 12/2010 | Gonen | B23B 51/048 408/186 |
| 2016/0089730 A1 * | 3/2016 | Kocherovsky | B23C 5/2472 407/88 |
| 2016/0136740 A1 * | 5/2016 | Mada | B23C 5/241 407/76 |

* cited by examiner

BORING TOOL

CROSS-REFERENCE TO RELATED APPLICATION

This application claims the benefit of U.S. Provisional Application Ser. No. 61/967,989, Mar. 31, 2014.

FIELD OF THE INVENTION

This invention relates to borers and cutters. More particularly, this invention relates to boring tools for use with rotating, axially moving machines for the creation of precise cylindrical recesses in work pieces.

BACKGROUND OF THE INVENTION

A common manufacturing operation is creating a cylindrical recess (a round hole) of a precise diameter at a precise location in a work piece. A boring tool (also known as a cutting tool or a boring bit) mounted in the spindle of a computer-controlled, rotating, axially moving milling machine is commonly used for the operation. The boring tool is a metal cylinder having an end for mounting in the spindle of the machine and a head. The head has one or more recesses on the outer surface of its boring end for mounting cartridges holding replaceable cutters (also known as cutting inserts or teeth). Both the radial (perpendicular to the axis of rotation) position and the axial (parallel to the axis of the rotation) positions of the cutters are important.

Cutters are typically made of carbide and eventually wear with prolonged use. As a result of the wear, the recesses created in the work piece would eventually decrease slightly in diameter. In operations where the diameter of the recess must be maintained precisely, it is necessary to periodically either replace the cutter or adjust its position. Having the ability to quickly and easily adjust the position of the cutter is highly advantageous because it minimizes the down time and cost.

Boring tools having a single, adjustable cutter are widely used. The adjustment is typically made with a screw that passes radially through the boring tool and engages the cartridge holding the cutter. The primary disadvantage of boring tools having a single cutter is that they are relatively slow.

Boring tools having two opposed cutters are also known. Other things being equal, a boring tool with two cutters creates a recess twice as fast as a boring tool with only one cutter. Several boring tools have been disclosed that have two opposed cutters whose radial positions are adjustable. For example, Muendlein et al., U.S. Pat. No. 5,188,490, Feb. 23, 1993, disclose a boring tool with two opposed cutters whose radial positions are adjusted by radial movement of two tapered rams. Stojanovski, U.S. Pat. No. 6,406,225, Jun. 18, 2002, discloses a boring tool with two opposed cutters whose radial positions are adjusted with a single radial adjusting screw. Pang, Chinese Pat. No. 102335759, Feb. 1, 2012, discloses a boring tool with two opposed cutters whose radial positions are adjusted with a radial double-headed bolt.

Boring tools having three or more cutters are also known. Boring tools with cutters whose radial positions are adjusted by axial adjustment of one or more wedge-shaped members are known. For example, Herrmann, U.S. Pat. No. 4,133,399, Jan. 9, 1979, discloses a boring tool having three or five cutters, each of whose radial position is adjusted by axial movement of an adjusting wedge. As the wedge moves further inward axially, it pushes the cartridge (or the cutter itself) further outward radially. Kanahoshi, Japanese Pat. No. 2006150535, Jun. 15, 2006, discloses a boring tool with five cutters, each of whose radial position is adjusted by axial movement of an adjusting wedge. Jiang, Chinese Pat. No. 203076611, Jul. 24, 2013, discloses a boring tool with three cutters whose radial positions are simultaneously adjusted by the axial movement of a single conical adjusting block.

While these multiple-cutter boring tools use adjusting wedges to adjust the radial positions of the cutters, the axial positions of the cutters are not easily adjusted. Accordingly, there is a demand for a boring tool that has one or more cutters whose radial and axial positions are both easily adjusted.

SUMMARY OF THE INVENTION

The general object of this invention is to provide an improved boring tool. A more particular object is to provide a boring tool with one or more cutters whose radial and axial positions are both easily, quickly, and precisely adjusted.

I have invented an improved boring tool. The boring tool comprises: (a) a cylindrical body with one or more recesses, each of which has a slot; (b) a wedge assembly in the slot of each recess; and (c) a cartridge/cutter assembly also in the slot of each recess. The cylindrical body has a longitudinal rotational axis and a circular boring end with a circumference. The recesses are spaced apart around the circumference. Each recess opens axially and radially. Each recess comprises a slot having an inward wall, a trailing wall with a substantially tangential threaded bore, a leading wall, and a base with an inner axial threaded bore and an outer axial threaded bore. Each recess additionally comprises a flute communicating with the leading wall of the slot.

Each wedge assembly comprises: (i) a wedge having an axial bore and being in an abutting relationship with the inward wall of the slot; and (ii) a wedge adjustment screw. The wedge adjustment screw passes axially through the bore in the wedge and engages the inner bore in the base of the slot such that rotation of the wedge adjustment screw causes the wedge to move axially along the inward wall of the slot.

Each cartridge/cutter assembly comprises: (i) a cartridge with a tangential bore; (ii) a cutter attached to the cartridge; (iii) a cartridge adjustment screw; and (iv) a cartridge mounting screw. The cartridge adjustment screw engages the outer axial threaded bore in the base of the slot and has an opposed head such that rotation of the cartridge adjustment screw causes the head to move axially. The cartridge rests on the head of the cartridge adjustment screw and moves axially as the head of the cartridge adjustment screw moves axially. The cartridge is in an abutting relationship with the wedge such that axial movement of the wedge causes radial movement of the cartridge. The cartridge mounting screw passes through the tangential bore in the cartridge and engages the tangential threaded bore in the trailing wall of the slot of the recess.

The boring tool of this invention has one or more cutters. The radial and axial positions of each cutter are easily, quickly, and precisely adjusted so that close tolerances are maintained as the cutters wear.

DETAILED DESCRIPTION OF THE INVENTION

1. The Boring Tool in General and Reference Characters

This invention is best understood by reference to the drawings. A preferred embodiment of the boring tool 10 of this invention has a body 11, a plurality of wedge assemblies 12, and a plurality of cartridge/cutter assemblies 13. These components are discussed in detail below.

The following additional reference numbers are used in the drawings with reference to body of the boring tool: 20—head; 22—boring end of head; 23—opposed end of head; 24—shank; 26—arbor screw opening; 28—drive pin; 30—recess; 32—slot, 33—keyhole; 34—flute; 36—outer axial threaded bore for cartridge adjustment screw; 38—inner axial threaded bore for wedge screw; 40—tangential threaded bore for cartridge mounting screw; 42—coolant channel; 44—slot base; 46—inward wall of slot; 48—leading side wall of slot; and 50—trailing side wall of slot.

The following additional reference characters are used in the drawings with reference to the wedge assemblies of the boring tool: 52—wedge screw; 54—wedge; 55—wedge base; 56—bore to receive wedge screw; 58—sloped side of wedge; 60—opposed straight side of wedge; 62—saddle portion of wedge; 64—wedge spring.

The following additional reference characters are used in the drawings with reference to the cartridge/cutter assemblies of the boring tool: 66—cartridge; 68—cutter (carbide tooth); 69—cutter screw; 70—tangential bore for cartridge mounting screw; 72—sloped side of cartridge; 74—opposed straight side of cartridge; 76—open portion of cartridge; 78—cartridge adjustment screw; 79—head of cartridge adjustment screw; 80—adjustment bores in head; 82—cartridge mounting screw; 84—washers.

The following reference characters are used in the drawings to indicate lines and distances: A—axial length of boring tool; CL—axial center line of head; R—boring radius; D1—distance from outermost portion of cutter to inward wall of slot with minimum boring radius; D2—distance from base of slot to wedge with minimum boring radius; D3—distance from outermost portion of cutter to inward wall of slot with maximum boring radius; and D4—distance from base of slot to wedge with maximum boring radius.

2. The Body

The body 11 has the general shape of a right circular cylinder. The cylinder has a longitudinal rotational axis which is generally vertical when in use. As used herein, the term "radius" refers to a line from the axis to outer surface which is horizontal when the rotational axis is vertical and the term "tangent" refers to a line that is perpendicular to the radius and which is horizontal when the rotational axis is vertical. The body has a head 20 with a boring end 22 and an opposed end 23. Integral with the head is a shank 24 having the same longitudinal axis as the head. The embodiment of the body shown includes an arbor screw opening 26 and a drive pin 28. The shank, arbor screw opening, and drive pin are adapted for mounting in the spindle of a computer-controlled, rotating, axially moving milling machine. Some machines require only the spindle, others require the arbor screw opening, and others require the drive pin. Including all three makes the body suitable for use in a wide variety of machines. Other variations of shanks and drive pins are known in the art and are suitable. The body is preferably made of a single piece of metal such as a steel alloy or aluminum. Steel alloys are generally preferred for their physical properties.

Figure 1:
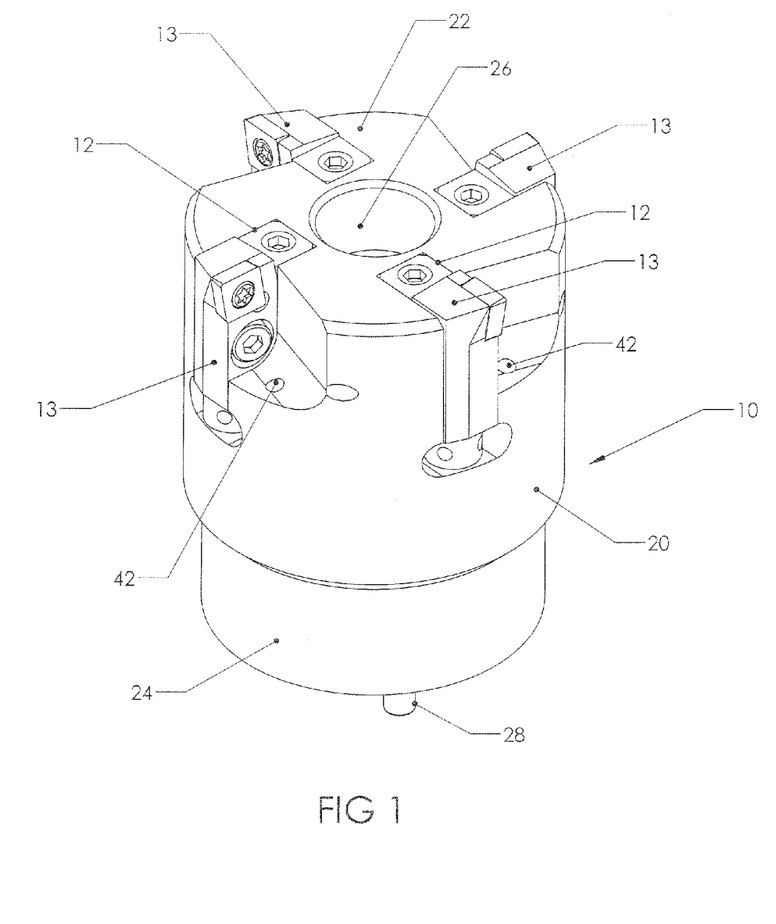
FIG. 1 is a perspective view of a preferred embodiment of the boring tool of this invention.
Figure 2:
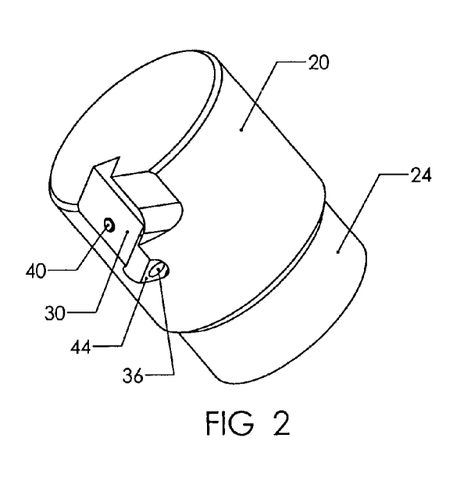
FIG. 2 is a perspective view of the body thereof.
Figure 3:
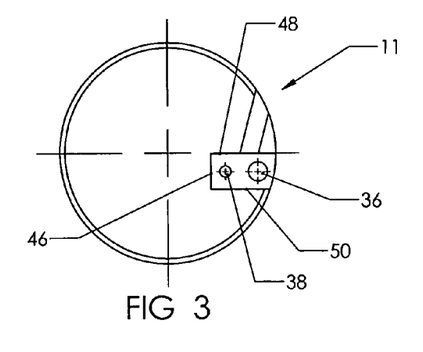
FIG. 3 is a top plan view thereof.
Figure 4:
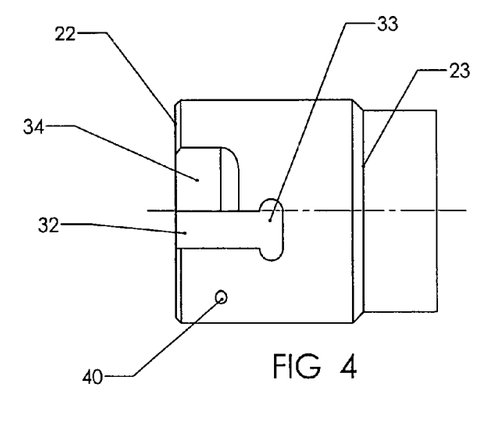
FIG. 4 is a side view thereof.
Figure 5:
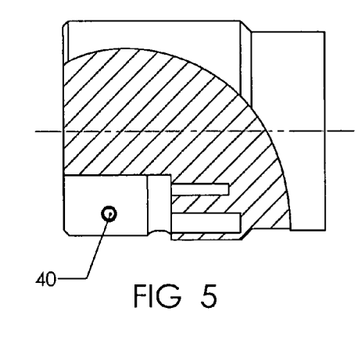
FIG. 5 is a partial sectional view thereof.

The boring end of the head contains one or more recesses 30 around its circumference. In the embodiment shown, there are four spaced apart recesses. Each recess opens both radially (outwardly on the curved surface) and axially (upwardly in the orientation shown in FIG. 1). Each recess is in the shape of a slot 32 and a flute 36. Each slot has a keyhole flare 33, a base 44, an inward wall 46, a leading wall 48, and a trailing wall 50. The terms "leading" and "trailing" refer to the rotational direction when in use. The flute communicates with the leading wall of the slot to discharge cut material.

Each recess contains three threaded bores for adjustment and attachment of the wedge assemblies and cartridge/cutter assemblies. Two axial bores are in the base and one tangential bore is in the trailing wall. An inner axial bore 38 in the base is used to attach the wedge assembly with the wedge screw and an outer axial bore 36 in the base is used to attach the cartridge adjustment screw. Tangential bore 40 in the trailing side wall is used to attach the cartridge. The tangential bore is substantially tangential, but not necessarily precisely tangential. A slight inward angle is preferred because it helps to counteract the centrifugal forces on the cartridge/cutter assembly during use. Locating the tangential bore in the leading side wall is much less desirable because the forces during boring are directed against, rather than with, the direction of the attachment.

A preferred embodiment of the body is preferably manufactured as follows. Referring to FIGS. 2 to 5, the first step is to use an end mill to cut a 0.305 inch slot with ends relieved. The distance from the centerline to the inner wall of the recess dictates the cutting diameter of the boring tool. The second step is to rotate the head 15 degrees to cut flute 34. This also exposes the location on the trailing wall of the recess for the M3×0.5 tapped bore for receiving the cartridge mounting screw. The tapped bore is at the 0.542×0.327 inch location and on 15 degrees (slightly inward of perfectly tangential). If desired, a coolant hole 42 is drilled into the flute that extends all the way through the head and the shank. The coolant hole enables coolant fluid to flow from the spindle of the machine, through the head, and onto the cutter and work piece. The coolant fluid provides cooling and lubrication that improves the boring. The desirability of providing coolant fluid through one or more longitudinal holes in a boring tool is well known in the industry.

The third step is to place the body in a vertical position to drill and tap the M5×0.8 and the M3×0.5 bores for receiving the cartridge adjusting screw and the wedge screw. Only one recess is shown in FIGS. 2 to 5. Steps one through three are then repeated for each recess. As explained in more detail below, the number of recesses is dictated by the diameter of the head (which, in turn, is dictated by the finish bore diameter in the work piece).

3. The Wedge Assemblies

A wedge assembly 12 is mounted in each recess. Each wedge assembly is used to adjust the radial position of its abutting cartridge/cutter assembly. Referring now to FIGS.

Figure 6:
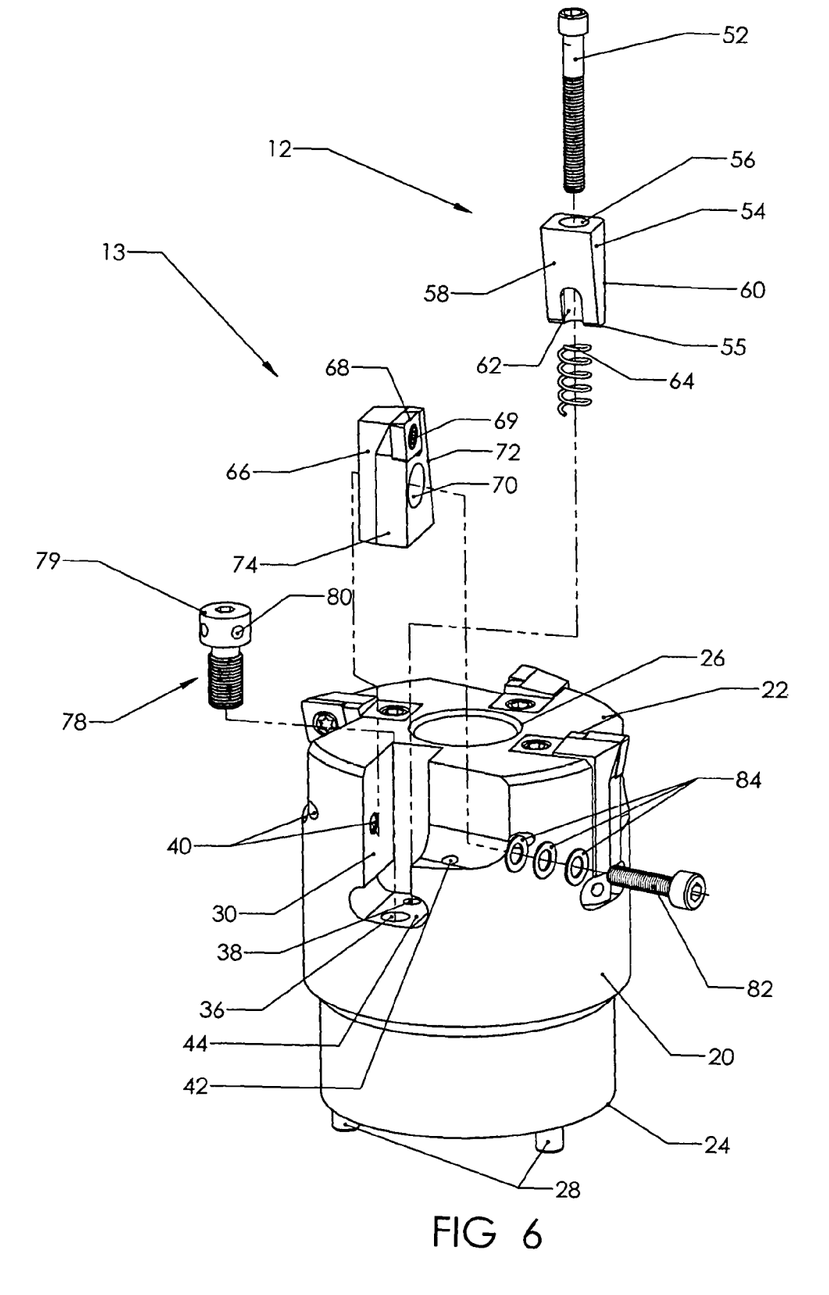
FIG. 6 is a perspective exploded view of a preferred embodiment of the boring tool of this invention.
Figure 7:
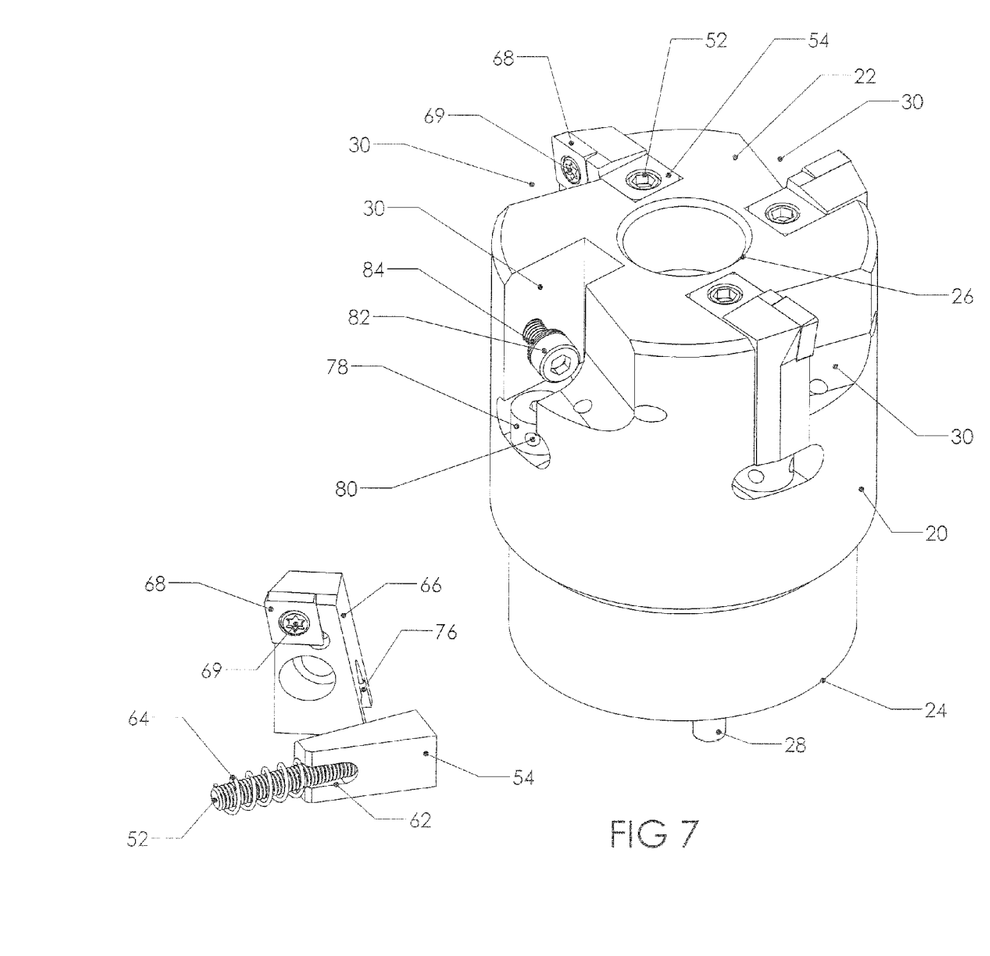
FIG. 7 is a perspective partially-assembled view thereof.
Figure 8:
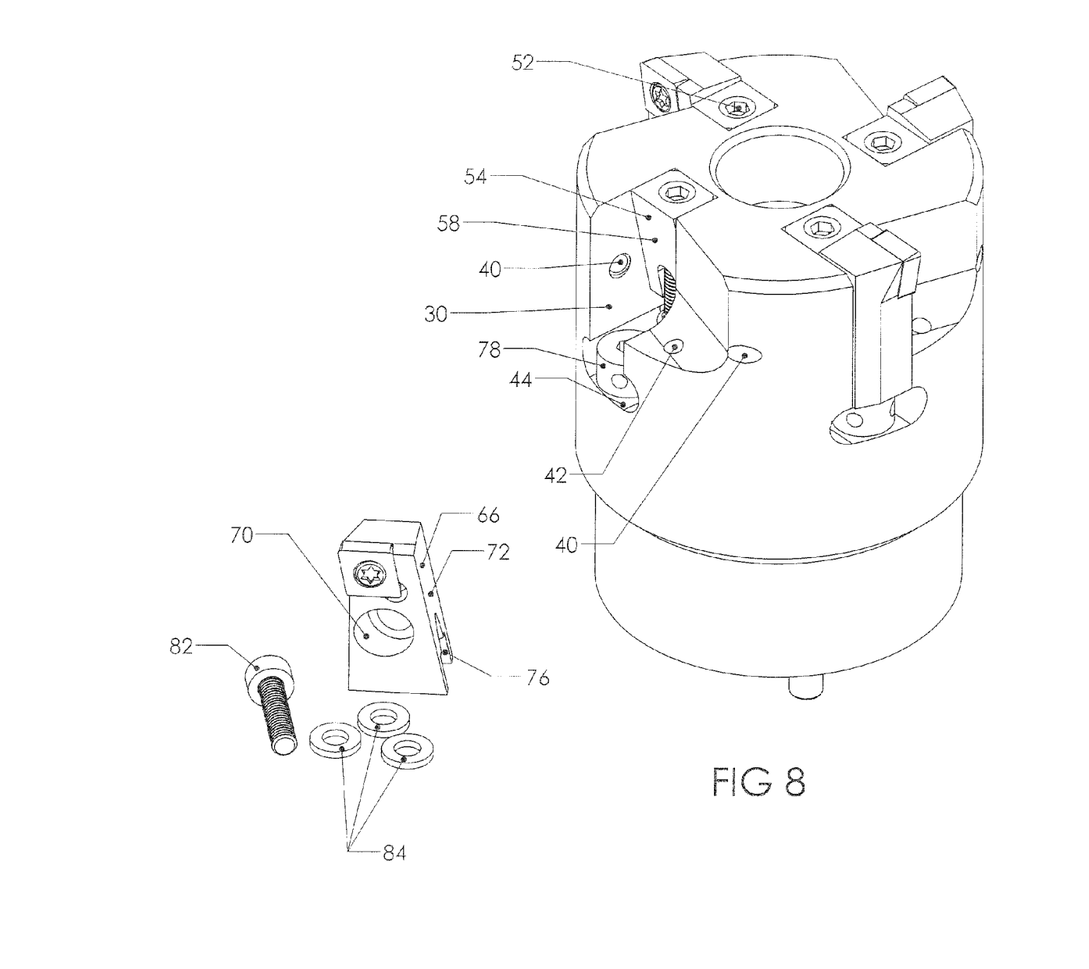
FIG. 8 is a perspective partially-assembled view thereof.

6 to 8, each wedge assembly comprises a wedge adjustment screw 52, a wedge 54 having a base 55, an axial bore 56 for receiving the wedge screw, a sloped side 58 that faces outwardly and abuts the cartridge/cutter assembly, an opposed straight side 60 that abuts the inward wall of the slot, a saddle portion 62, and a wedge spring 64. The terms "straight" and "sloped" refer to the orientation of the sides relative to the longitudinal rotational axis.

The wedge is mounted into the recess by screwing the wedge screw into the inner axial bore in the base of the slot against the force provided by the wedge spring. It can be appreciated that rotation of the wedge adjustment screw causes the wedge to move axially which, in turn, causes the cartridge/cutter assembly to move radially.

Figure 9A:
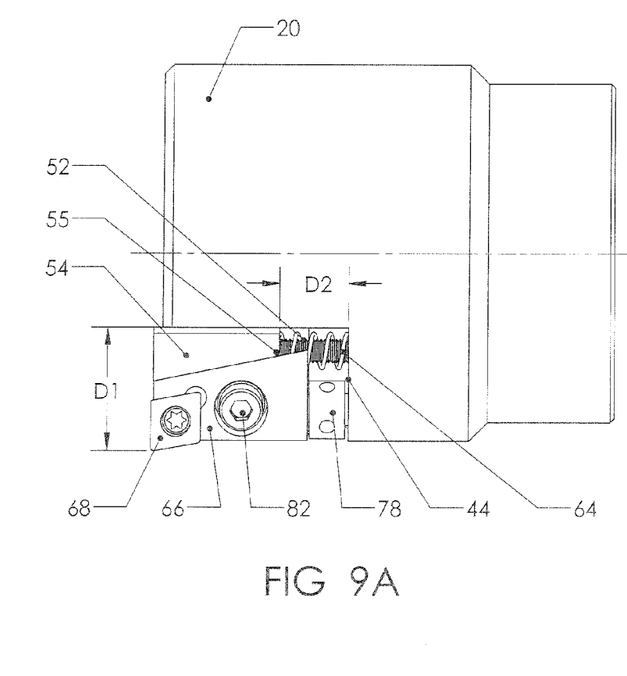
FIG. 9A is a partial sectional side view thereof showing the minimum boring diameter.
Figure 9B:
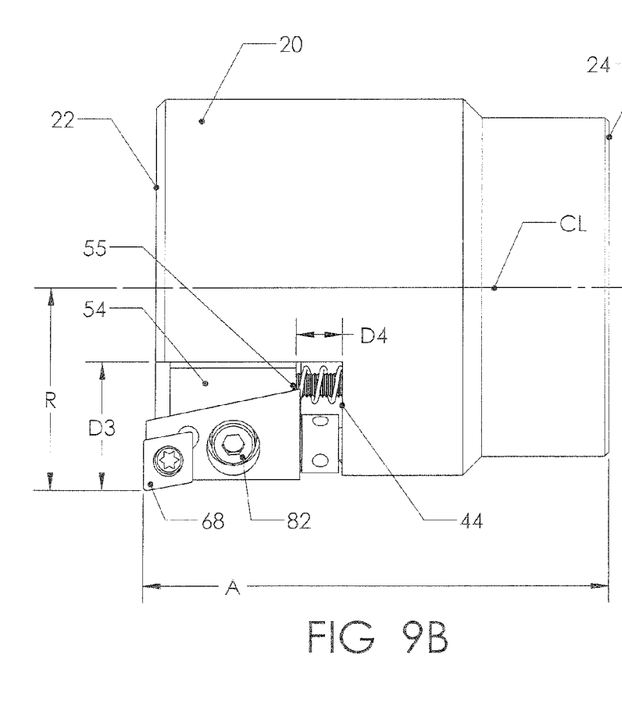
FIG. 9B is a partial sectional side view thereof showing the maximum boring diameter.

The angle of the sloped side is a matter of choice and is generally about 5 to 45 degrees and is preferably about 8 to 20 degrees. The angle is best seen in FIGS. 9A and 9B. FIGS. 9A and 9B are partial sections, but cross-hatching around the slot is omitted for clarity. If desired, the angle of the sloped side is chosen so that a given rotation of the wedge screw causes a given radial movement of the cartridge/cutter assembly. For example, in the preferred embodiment, the angle is set at about 11.5 degrees to the rotational axis so that one rotation of the wedge screw causes a radial movement of 0.004 inches. The saddle portion of the wedge straddles the wedge screw and provides the maximum surface area for contact with the cartridge as discussed in more detail below.

4. The Cartridge/Cutter Assemblies

A cartridge/cutter assembly 13 is also mounted in each recess. Each cartridge/cutter assembly is adjustable both axially and radially. Referring to FIGS. 6 to 8, each cartridge/cutter assembly comprises a cartridge 66, a cutter 68 mounted to the cartridge body with a cutter screw 69, a smooth unthreaded bore 70 for receiving the cartridge mounting screw, a sloped side 72 that faces inwardly and abuts the wedge, an opposed straight side 74, an open portion 76, a cartridge adjustment screw 78 having a head 79 with adjustment bores 80, a cartridge mounting screw 82, and washers 84. The cutter is conventional, replaceable, and is preferably made of carbide with axial and radial cutting surfaces.

As with the wedge, the terms "straight" and "sloped" refer to the orientation of the sides relative to the longitudinal rotational axis. As best seen in FIGS. 9A and 9B, the sloped side of the cartridge preferably makes the same angle to the rotational axis as the sloped side of the wedge so that their sloped sides abut precisely to maximize their contact area. The open portion at the base of the sloped side provides clearance for the wedge adjustment screw.

After the wedge assembly is mounted into the recess, the cartridge adjustment screw is screwed into the outer axial bore in the base of the slot. The cartridge is then set upon the head of the cartridge adjustment screw with its sloped side facing inwardly and abutting the sloped side of the wedge. It can be appreciated that rotation of the cartridge adjustment screw causes the cartridge to move axially. The cartridge adjustment screw is adjusted by inserting a pin into one of the adjustment bores in the head. The keyhole flare enables the pin to moved about a greater arc. If desired, the thread pattern and the number of bores are chosen so that a given rotation produces to an exact distance of axial travel. The cartridge mounting screw is then inserted through the cartridge bore and into the tangential threaded bore in the trailing wall of the recess. The cartridge mounting screw is tightened snugly, but not fully. The bore of the cartridge is preferably slightly oversized so that slight lateral movement of the cartridge is allowed before the cartridge mounting screw is fully tightened. As seen in FIGS. 7 and 8, an oversized counterbore is preferred.

The cartridge is then adjusted for precise positioning of the cutter by moving the cartridge adjusting screw for axial position and by rotating the wedge adjustment screw to move the wedge axially which, in turn, moves the cartridge radially. When the precise axial and radial position of the cutter is achieved, the cartridge mounting screw is fully tightened to prevent any further movement. The washers are preferably of the Belleville or other spring type to provide a secure mount. If additional anchoring is desired, a locking screw, clamp, or the like is easily added.

5. Number of Recesses

The maximum number of recesses in the body (and the number of wedge assemblies and cartridge/cutter assemblies) are functions of the diameter of the head. The diameter of the head is generally about 1.5 to 4 inches, but smaller and larger diameters are also suitable. It is often desirable to place as many cartridge/cutter assemblies as can fit in a body of a given diameter. The following table shows the maximum number of recesses that can be easily incorporated in a body of a given diameter range:

| Diameter Range (inches) | Number of Recesses |
| --- | --- |
| 1.500 to 1.600 | 3 |
| 1.601 to 1.932 | 4 |
| 1.933 to 2.268 | 5 |
| 2.269 to 2.748 | 6 |
| 2.749 to 2.988 | 7 |
| 2.989 to 3.468 | 8 |
| 3.469 to 3.708 | 9 |
| 3.709 to 3.996 | 10 |

A greater or lesser number of recesses can be incorporated for the stated diameters. For example, it may be desirable to incorporate only one or two recesses in the body. Regardless of how many recesses are present, it is generally preferable that they be spaced non-symmetrically around the circumference to prevent chatter or vibration when boring. For example, if the body contains five recesses, a symmetrical spacing of 72 degrees between recesses is suitable, but a non-symmetrical spacing of 72, 67, 77, 69, and 75 degrees would generally be more preferable. The desirability of non-symmetrical spacing is well known in the industry.

6. Uses and Advantages

The boring tool of this invention allows for the use of replaceable carbide cutters for economy while providing precise adjustment to many cutting edges meeting close-tolerance finish requirements in a range of diameters. This is done with a wedge-actuated adjusting system that allows the compact nature of the cartridge. A key feature is the functionality of the wedge assembly and the moveable cartridge/cutter assembly for precise adjustment of the cutting edge.

The relationship of the wedge assemblies, the cartridge/cutter assemblies, and the resulting boring radius is shown in FIGS. 9A and 9B. As previously mentioned, FIGS. 9A and 9B are partial sections, but cross-hatching around the slot is omitted for clarity. The centerline CL (longitudinal rotational axis) is shown in FIG. 9A. The boring radius R (one-half of the boring diameter) and the overall axial length A are shown in FIG. 9B.

The minimum boring radius for a given set of components is shown in FIG. 9A where D1 is the distance from the outermost part of the cutter to the straight side of the wedge and D2 is the distance from base of the wedge to the base of the recess. The maximum boring radius for a given set of components is shown in FIG. 9B where D3 is the distance from the outermost part of the cutter to the straight side of the wedge and D4 is the distance from base of the wedge to the base of the recess. Comparing FIGS. 9A and 9B, it can be seen that D3 is greater than D1 and that D2 is greater than D4. The distance between D1 and D3 is the range of minimum boring radius to the maximum boring radius. The actual boring radius is typically between these two extremes. In one embodiment, D1 is 0.617 inches and D3 is 0.642 inches, giving a range of 0.025 inches. In the same embodiment, D2 is 0.351 inches and D4 is 0.228 inches.

I claim:

1. A boring tool comprising: (a) a cylindrical body having a longitudinal rotational axis and a circular boring end with a circumference, one or more spaced apart recesses around the circumference, each recess opening axially and radially, each recess comprising a slot having an inward wall, a trailing wall with a substantially tangential threaded bore, a leading wall, and a base with an inner axial threaded bore and an outer axial threaded bore, each recess additionally comprising a flute communicating with the leading wall of the slot; (b) a wedge assembly in the slot of each recess, each wedge assembly comprising: (i) a wedge having an axial bore, an inwardly-facing straight face, and an outwardly-facing sloped face with the inwardly-facing straight face being in an abutting relationship with the inward wall of the slot; and (ii) a wedge adjustment screw, the wedge adjustment screw passing axially through the bore in the wedge and engaging the inner axial threaded bore in the base of the slot such that rotation of the wedge adjustment screw causes the wedge to move axially along the inward wall of the slot; and (c) a cartridge/cutter assembly in the slot of each recess, each cartridge/cutter assembly comprising: (i) a cartridge with a tangential bore and an inwardly-facing sloped face; (ii) a cutter attached to the cartridge; (iii) a cartridge adjustment screw; and (iv) a cartridge mounting screw, the cartridge adjustment screw engaging the outer axial threaded bore in the base of the slot and having an opposed head such that rotation of the cartridge adjustment screw causes the head to move axially, the cartridge resting on, and in an abutting relationship with, the head of the cartridge adjustment screw and moving axially as the head of the cartridge adjustment screw moves axially, the cartridge being located radially outward from the wedge, and the inwardly-facing sloped face of the cartridge being in an abutting relationship with the outwardly-facing sloped face of the wedge along a planar surface such that axial movement of the wedge causes radial movement of the cartridge, the cartridge mounting screw passing through the tangential bore in the cartridge and engaging the tangential threaded bore in the trailing wall of the slot of the recess.

2. The boring tool of claim 1 wherein the body contains a plurality of recesses.

3. The boring tool of claim 2 wherein the body contains three or more recesses.

4. The boring tool of claim 1 wherein the head of each cartridge adjustment screw contains adjustment bores.

5. The boring tool of claim 1 wherein the recesses are non-symmetrically distributed around the circumference.

6. The boring tool of claim 1 wherein the bore of the cartridge has a diameter that exceeds the diameter of the head of the cartridge mounting screw sufficiently to allow lateral movement until final tightening.

7. A boring tool comprising: (a) a body with a cylindrical head having a longitudinal rotational axis and a circular boring end with a circumference, one or more spaced apart recesses around the circumference, each recess opening axially and radially, each recess comprising a slot having an inward wall, a trailing side wall, a leading side wall, a substantially tangential threaded bore in either the trailing side wall or in the leading side wall, and a base with an inner axial threaded bore and an outer axial threaded bore, each recess additionally comprising a flute communicating with the leading wall of the slot; (b) a wedge assembly in the slot of each recess, each wedge assembly comprising: (i) a wedge having an axial bore, an inwardly-facing straight face, and an outwardly-facing sloped face with the inwardly-facing straight face being in an abutting relationship with the inward wall of the slot; and (ii) a wedge adjustment screw, the wedge adjustment screw passing axially through the bore in the wedge and engaging the inner axial threaded bore in the base of the slot such that rotation of the wedge adjustment screw causes the wedge to move axially along and against the inward wall of the slot; and (c) a cartridge/cutter assembly in the slot of each recess, each cartridge/cutter assembly comprising: (i) a cartridge with a tangential bore having a counterbore to accommodate a head of a screw and an inwardly-facing sloped face; (ii) a cutter attached to the cartridge, the cutter extending radially outward from the body; (iii) a cartridge adjustment screw; and (iv) a cartridge mounting screw, the cartridge adjustment screw engaging the outer axial threaded bore in the base of the slot and having an opposed head such that rotation of the cartridge adjustment screw causes the head to move axially, the cartridge resting on the head of the cartridge adjustment screw and moving axially as the head of the cartridge adjustment screw moves axially, the cartridge being located radially outward from the wedge, and the inwardly-facing sloped face of the cartridge being in an abutting relationship with the outwardly-facing sloped face of the wedge along a planar surface such that axial movement of the wedge causes radial movement of the cartridge, the cartridge mounting screw passing through the tangential bore in the cartridge and engaging the tangential threaded bore in the trailing side wall of the slot of the recess, the cartridge mounting screw having a head that is smaller than the counterbore in the cartridge.

8. The boring tool of claim 7 wherein the body contains a plurality of recesses.

9. The boring tool of claim 7 wherein the body contains three or more recesses.

10. A boring tool with one or more cutters, each of which is adjustable radially and axially independently, the boring tool comprising: (a) a cylindrical body having a longitudinal rotational axis and a circular boring end with a circumference, one or more spaced apart recesses around the circumference, each recess opening axially and radially, each recess comprising a slot having an inward wall, a trailing wall with a substantially tangential threaded bore, a leading wall, and a base with an inner axial threaded bore and an outer axial threaded bore, each recess additionally comprising a flute communicating with the leading wall of the slot; (b) a cartridge/cutter assembly in the slot of each recess, each cartridge/cutter assembly comprising: (i) a cartridge with a tangential bore and an inwardly-facing sloped face; (ii) a cutter attached to the cartridge; (c) a wedge assembly in the slot of each recess positioned radially inwardly of the cartridge, each wedge assembly comprising: (i) a wedge having an axial bore, an inwardly-facing straight face, and an outwardly-facing sloped face, the straight face being in an abutting relationship with the inward wall of the slot and the sloped face being in an abutting relationship with the sloped face of the cartridge along a plane of contact; and (ii) a wedge adjustment screw passing axially through the bore in the wedge and engaging the inner axial threaded bore in the base of the slot such that rotation of the wedge adjustment screw causes the wedge to move axially along the inward wall of the slot, the cartridge being in an abutting relationship with the wedge such that axial movement of the wedge causes radial movement of the cartridge; (d) a cartridge adjustment screw engaging the outer axial threaded bore in the base of the slot and having an opposed head such that rotation of the cartridge adjustment screw causes the head to move axially, the cartridge resting on, and being in an abutting relationship with, the head of the cartridge adjustment screw and moving axially as the head of the cartridge adjustment screw moves axially; and (e) a cartridge mounting screw passing through the tangential bore in the cartridge and engaging the tangential threaded bore in the trailing wall of the slot of the recess.

11. The boring tool of claim 10 wherein the body contains a plurality of recesses.

12. The boring tool of claim 11 wherein the body contains three or more recesses.

13. The boring tool of claim 12 wherein the recesses are non-symmetrically distributed around the circumference.

14. The boring tool of claim 10 wherein the head of each cartridge adjustment screw contains adjustment bores.

15. The boring tool of claim 10 wherein the bore of the cartridge has a diameter that exceeds the diameter of the head of the cartridge mounting screw sufficiently to allow lateral movement until final tightening.

* * * * *